United States Patent [19]

Yokota et al.

[11] Patent Number: 4,822,998
[45] Date of Patent: Apr. 18, 1989

[54] SPECTRAL SENSOR WITH INTERFERENCE FILTER

[75] Inventors: Satoshi Yokota; Masami Sugiyama; Nobukazu Kawagoe, all of Toyonaka; Tomoko Miyaura, Habikino, all of Japan

[73] Assignee: Minolta Camera Kabushiki Kaisha, Osaka, Japan

[21] Appl. No.: 49,287

[22] Filed: May 12, 1987

[30] Foreign Application Priority Data

| May 15, 1986 | [JP] | Japan | 61-111497 |
| May 15, 1986 | [JP] | Japan | 61-111498 |
| Aug. 8, 1986 | [JP] | Japan | 61-187360 |
| Oct. 14, 1986 | [JP] | Japan | 61-245084 |

[51] Int. Cl.[4] .................... G01J 3/51
[52] U.S. Cl. .................... 250/226; 356/352; 356/419; 350/166
[58] Field of Search .......... 250/216, 226; 356/352, 356/419; 350/163, 164, 166

[56] References Cited

U.S. PATENT DOCUMENTS

| 3,498,693 | 3/1970 | Fein et al. | 350/166 |
| 3,552,826 | 1/1971 | Hanes et al. | 350/166 |
| 4,309,108 | 1/1982 | Siebert | 356/352 |
| 4,425,501 | 1/1984 | Stauffer | 250/216 |
| 4,547,704 | 10/1985 | Hinoda et al. | 250/226 |

FOREIGN PATENT DOCUMENTS

| 55-161230 | 11/1980 | Japan . |
| 56-125638 | 10/1981 | Japan . |
| 57-60231 | 4/1982 | Japan . |
| 57-204427 | 12/1982 | Japan . |
| 58-95223 | 6/1983 | Japan . |
| 60-107532 | 6/1985 | Japan . |
| 60-135632 | 9/1985 | Japan . |
| 60-198421 | 10/1985 | Japan . |
| 60-237331 | 11/1985 | Japan . |

Primary Examiner—Edward P. Westin
Assistant Examiner—Khaled Shami
Attorney, Agent, or Firm—Price, Gess & Ubell

[57] ABSTRACT

A spectral sensor comprises that a plurality of arrays of light receiving elements sensitive to different wavelength ranges which are arranged in a non-overlapping relationship with each other within the imaginary circle of a diameter smaller than the sum of lengths of the resective arrays of light receiving elements, and a filtering element of different transmission wavelength for each of the light receiving elements of all of the arrays, which filtering element is arranged in register with the respective light receiving element.

12 Claims, 5 Drawing Sheets

SPECTRAL SENSOR WITH INTERFERENCE FILTER

BACKGROUND OF THE INVENTION

1. Field of Technology

The present invention generally relates to the detection of different wavelengths of light and, more particularly, to a spectral sensor of a type which comprises a light receiving unit having an array of light receiving elements, and a filter having a corresponding number of filtering elements of different transmission wavelengths and mounted on the light receiving unit with the filtering elements aligned respectively with the light receiving elements.

2. Description of the Prior Art

Figure 13A:
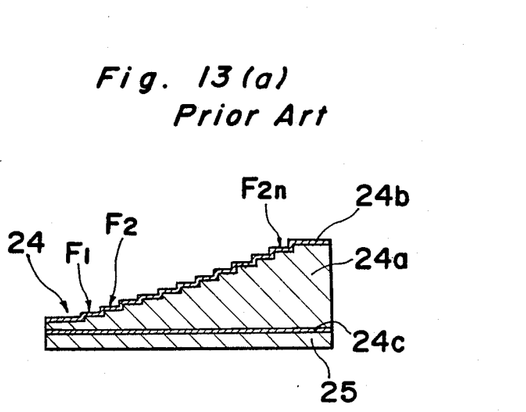
FIG. 13(a) is a sectional view of the interference filter used in the prior art spectral sensor.
Figure 13B:
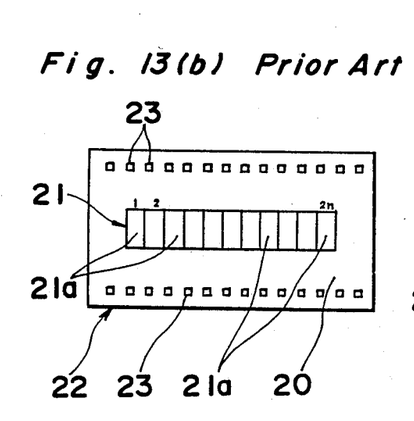
FIG. 13(b) is a plan view of the silicon photodiode array used in the prior art spectral sensor.

The above described type of spectral sensor is disclosed in, for example, the Japanese Laid-open Patent Publication No. 59-20804 and is reproduced in FIG. 13 of the accompanying drawings for the purpose of the dicussion of the prior art, wherein FIG. 13($a$) illustrates, in sectional view, an interference filter used in the prior art spectral sensor and FIG. 13($b$) illustrates, in top plan view, a light receiving unit having an array of silicon photodiodes.

Referring first to FIG. 13($b$), the light receiving unit comprises a silicon substrate 20 having $2n$ of silicon photodiodes 21$a$ fixedly mounted or formed on one surface of the silicon substrate 20 in a linear row, the assembly constituting a silicon photodiode array chip 22. The silicon substrate 20 has a plurality of, for example, two, rows of terminals 23 formed thereon which are electrically connected with the individual silicon photodiodes 21$a$ by means of respective aluminum electrodes (not shown).

The interference filter 24, best shown in FIG. 13($a$), comprises a silicon dioxide ($SiO_2$) layer 24$a$ having first and second major surfaces opposite to each other across the thickness thereof, only the first major surface being progressively stepped inwardly of the silicon dioxide layer 24$a$ with the thickness thereof varying in stepwise fashion to provide a number of lands while the second major surface remains flat. The first and second major surfaces of the silicon dioxide layer 24$a$ are exteriorly deposited with respective silver films 24$b$ and 24$c$ by the use of any known metal vapor deposition technique, and the silicon dioxide layer 24$a$ is mounted on a glass substrate 25 with the silver film 24$c$ sandwiched between the glass substrate 25 and the silicon dioxide layer 24$a$.

The lands on the first major surface of the silicon dioxide layer 24$a$ have identical surface areas, the number of such lands being generally selected to be equal to the number of wavelengths of light to be detected, that is, the number $2n$ of the silicon photodiodes 21$a$. Conterminous bodies of the silicon dioxide layer 24$a$ that are aligned with the respective lands on the first major surface of the silicon dioxide layer 24$a$, which bodies have varying thicknesses, constitute respective filter elements $F_1$ to $F_{2n}$. The greater the thickness of the filtering element, the longer the transmission wavelength, and, in the instance as shown, the shortest and longest transmission wavelength ranges may be 400 nm and 700 nm and exhibited respectively by $F_1$ and $F_{2n}$.

In one type, the interference filter 24 is mounted on the photodiode array chip 22 with the glass substrate 25 held in contact with respective light receiving surfaces of the silicon photodiodes 21$a$, and in another type, the interference filter 24 is mounted on the photodiode array chip 22 in spaced relationship thereto. It is, however, to be noted that, in FIG. 13, the interference filter is shown as exaggerated as compared with the photodiode array chip 22 in the thicknesswise direction thereof.

Figure 14:
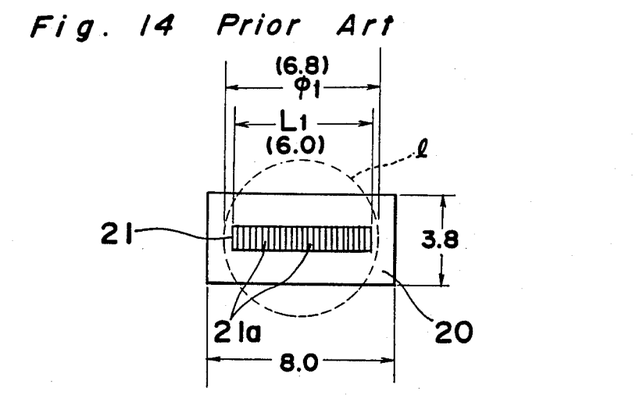
FIG. 14 is a plan view showing the relationship between the silicon photodiode array and the spot of the incident light falling thereon in the prior art spectral sensor.

A light spot 1 sensed by the prior art spectral sensor of the construction hereinabove described is so selected as to have a spot size $\phi_1$ slightly greater than the length $L_1$ of the photodiode array 21 such that, when it impinges upon the photodiode array 21, the photodiode array 21 can be sufficiently covered by the spot of the light beam, as shown in FIG. 14. By way of example, the length $L_1$ of the photodiode array 21 formed on the silicon substrate 20 of 8.0 mm in length and 3.8 mm in width is 6.0 mm, and, in such case, the size $\phi_1$ of the light spot 1 is chosen to be 6.8 mm.

Figure 15:
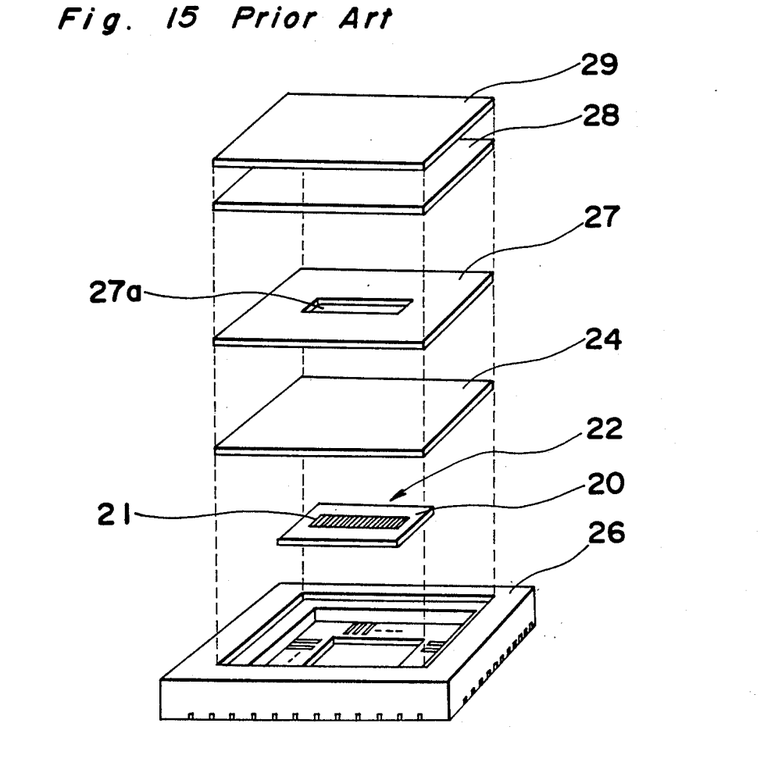
FIG. 15 is an exploded view of the prior art spectral sensor.

FIG. 15 illustrates, in exploded view, the prior art spectral sensor wherein the assembly of the photodiode array chip 22 and the interference filter 24 is covered with an ultraviolet light cut-off filter 28 and an infrared light cut-off filter 29. More specifically, the spectral sensor shown in FIG. 15 is completed by accommodating the photodiode array chip 22, the interference filter 24, a slit member 27, the ultraviolet light cut-off filter 28 and the infrared light cut-off filter 29 one above the other within a package 26 in the order specified above. The slit member 27 has a generally rectangular slit 27$a$ defined therein, said rectangular slit 27$a$ being of a size equal to that of the photodiode array 21 and is so positioned and so held in position with the slit 27$a$ aligned with the photodiode array 27$a$. The ultraviolet light cut-off filter 28 is utilized to cut off a secondary wavelength component in the long wavelength range, whereas the infrared light cut-off filter 29 is utilized to cut off a long wavelength component in the short wavelength range.

The prior art spectral sensor of the construction shown in and described with reference to FIGS. 13 to 15 has the following problems. Specifically, since the photodiodes 21$a$ are arranged in a linear row, the radiating light spot 1 must have a spot size $\phi_1$ greater than the length $L_1$ of the photodiode array 21. This in turn requires the use of the substrate 20 having an increased surface area, accompanied by increase in size of the photodiode array chip 22.

While the photodiodes required to be covered by the ultraviolet light cut-off filter 28 is arranged for receiving the light of the long wavelength range and the photodiodes required to be covered by the infrared light cut-off filter 29 is arranged for receiving the light of the short wavelength range, the filters 28 and 29 used in the prior art spectral sensor are each so sized as to cover the entire photodiodes and, therefore, these filters have respective unnecessary portions which work for nothing. Moreover, in the ultraviolet light cut-off filter 28, unless the cut-off characteristic thereof is sharp, there is a possibility in that reduction in output would occur in the short wavelength range to such an extent as to result in difficulty in a highly precise measurement.

Figure 8:
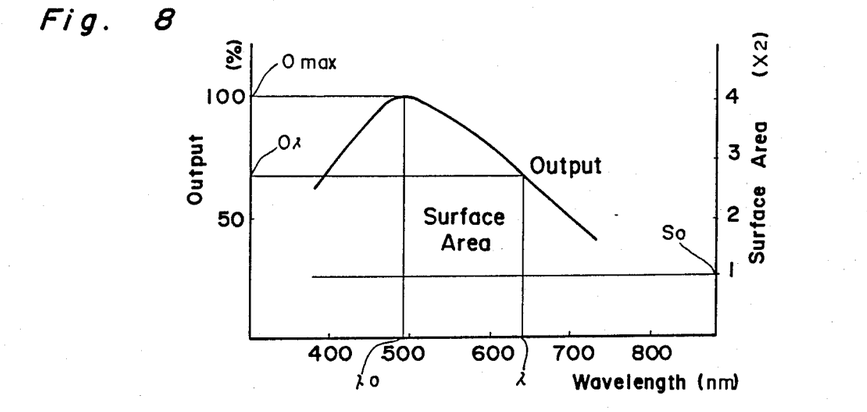
FIG. 8 is a graph showing the relationship among the output, the light receiving surface area and the wavelength.

In the prior art spectral sensor of the construction shown in and described with particular reference to FIG. 13, since the light receiving surface areas of the respective filtering elements F1 to Fn of the interference filter 24 are identical in size with each other, each silicon photodiode 21$a$ has such a characteristic, as shown in FIG. 8, that the output thereof gradually decreases as the wavelength of light becomes short from about 500 nm, due to the reduction of the photoelectric conversion efficiency and that the output thereof gradually decreases as the wavelength of light becomes long from about 500 nm due to the reduction of the transmission of the interference filter 24.

Since the output varies with the wavelength as hereinabove described, the prior art spectral sensor requires the use of amplifiers of different gains one for each of the silicon photodiodes 21a sensitive to the different wavelengths and, therefore, not only does the circuit as a whole tend to become complicated, but also the S/N ratio varies with the wavelength to such an extent as to result in the difficulty of a highly precise measurement.

SUMMARY OF THE INVENTION

Accordingly, the present invention has been devised with a view to substantially eliminating the above described problems inherent in the prior art spectral sensor and has for its essential object to provide an improved spectral sensor which can satisfactorily work with a bundle of light having a reduced cross-sectional shape and wherein a photodiode array chip of reduced size having the light receiving elements formed thereon can therefore be used.

In order to accomplish the above described object of the present invention, the spectral sensor herein disclosed is featured in that a plurality of arrays of light receiving elements sensitive to different wavelength ranges are arranged in a non-overlapping relationship with each other within the imaginary circle of a diameter smaller than the sum of lengths of the respective arrays of light receiving elements, and that a filtering element of different transmission wavelength for each of the light receiving elements of all of the arrays is arranged in register with the respective light receiving element.

With the construction according to the present invention, for a given number of the light receiving elements, these light receiving elements used in the prior art are arranged in a single linear array whereas, according to the present invention, these light receiving elements are divided into a plurality of groups each having the light receiving elements arranged in a respective linear array. Therefore, the number of the light receiving elements for each array, hence, the length of each array of the light receiving elements, used in the practice of the present invention is smaller than that according to the prior art.

Since according to the present invention these arrays of the light receiving elements are arranged in non-overlapping relationship so as to be covered within the circle of a diameter smaller than the sum of the lengths of the respective arrays of the light receiving element, not only can the spot size of the incident light be reduced, but the size of the array chip can also be reduced.

BRIEF DESCRIPTION OF THE DRAWINGS

This and other objects and features of the present invention will become clear from the following description taken in conjunction with a preferred embodiment thereof with reference to the accompanying drawings, in which.

DETAILED DESCRIPTION OF THE EMBODIMENT

Figure 1:
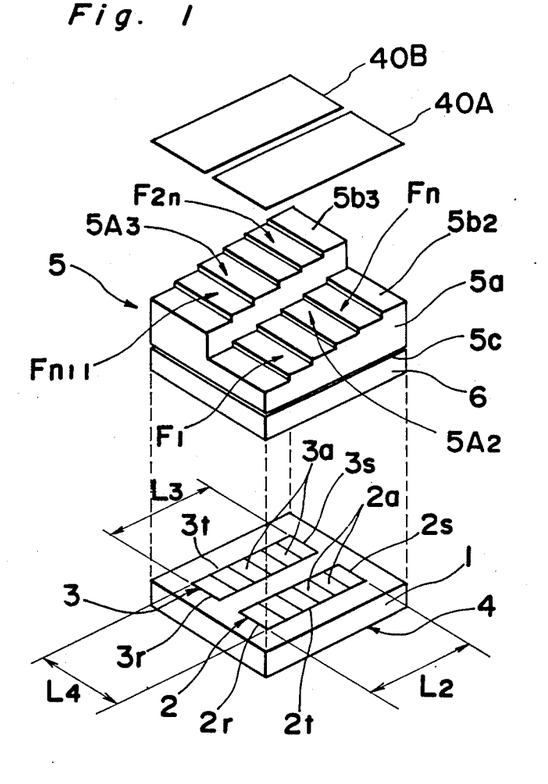
FIG. 1 is a schematic exploded view of a spectral sensor according to an embodiment of the present invention.

Referring first to FIG. 1, the spectral sensor according to an embodiment of the present invention includes an array chip which comprises a silicon substrate 1 and a plurality of, for example, two, arrays 2 and 3 each having a n-number of silicon photodiodes 2a or 3a, which arrays are mounted or formed on one surface of the substrate 1. These photodiode arrays 2 and 3 have different sensitivities to light, and the photodiode array 2 is sensitive to a short wavelength range, for example, 400 to 550 nm, while the photodiode array 3 is sensitive to a long wavelength range, for example, 550 to 700 nm.

The photodiode array 2 has a length $L_2$, as measured from one 2r of its end to the other 2s of the opposite end, which is equal to the length $L_3$ of the photodiode array 3 as measured from one 3r of its end to the other 3s of the opposite end. These photodiode arrays 2 and 3 are mounted or formed on the surface of the substrate 1 with the opposite ends 2r and 2s of the photodiode array 2 aligned with the opposite ends 3r and 3s of the photodiode array 3 and in side-by-side fashion with each other while spaced such a distance from each other that the distance $L_4$ between one 2t of the opposite side edges of the photodiode array 2 remote from the photodiode array 3 and one 3t of the opposite side edges of the photodiode array 3 remote from the photodiode array 2 may be substantially or approximately equal to any one of the respective lengths $L_2$ and $L_3$ of the photodiode arrays 2 and 3.

The respective lengths $L_2$ and $L_3$ of the photodiode arrays 2 and 3 are so selected that both of the photodiode arrays 2 and 3 can be covered within the imaginary circle of a diameter $\phi$ which is smaller than the sum of the lengths $L_2$ and $L_3$. So far shown, since the photodiode arrays 2 and 3 are parallel to each other, the both will never overlap with each other.

The spectral sensor according to the embodiment also includes an interference filter 5 which comprises a glass substrate 6 and a silicon dioxide (SiO$_2$) layer 5a having first and second major surfaces opposite to each other across the thickness thereof, the second major surface being deposited with a silver (Ag) layer 5c by the use of any known metal vapor deposition technique, said silicon dioxide layer 5a being mounted on the glass substrate 6 with the silver layer 5c interposed therebetween.

The silicon dioxide layer 5a generally square in shape so far shown and, correspondingly, similar in shape to the photodiode array chip 4 is of one-piece construction including generally rectangular first and second halves 5A$_2$ and 5A$_3$. While respective surface areas of the first and second halves 5A$_2$ and 5A$_3$ forming the second major surface of the silicon dioxide layer 5a are flush with each other, respective surface areas of the first and second halves 5A$_2$ and 5A$_3$ forming the first major surface of the silicon dioxide layer 5a are set back relative to each other in a direction across the thickness of the silicon dioxide layer 5a. As is the case with the interference filter used in the prior art spectral sensor shown in and described with reference to FIGS. 13 to 15, each of the surface areas of the first and second halves 5A$_2$ and 5A$_3$ forming the first major surface of the silicon dioxide layer 5a is progressively stepped inwardly of the silicon dioxide layer 5a with the respective thickness thereof varying in stepwise fashion to provide a respective flight of lands, the number of said land in each flight being equal to the number of the silicon photodiodes 2a or 3a of the respective array 2 or 3.

The respective flights of the lands in the first and second halves 5A$_2$ and 5A$_3$ are deposited with respective silver (Ag) layers 5b$_2$ and 5b$_3$. Conterminous bodies of the first half 5A$_2$ that are aligned with the respective lands on the surface area of such first half 5A$_2$ constitute respective filter elements F$_1$ to F$_n$ capable of transmitting relatively short, different wavelengths ranging from 400 to 550 nm therethrough, while conterminous bodies of the second half 5A$_3$ that are aligned with the respective lands on the surface area of such second half 5A$_3$ constitute respective filter elements F$_{n+1}$ to F$_{2n}$ capable of transmitting relatively long, different wavelengths ranging from 550 to 700 nm therethrough. In each of the halves 5A$_2$ and 5A$_3$, the greater the thickness is, the longer is the wavelength that is transmitted therethrough.

The interference filter 5 may be mounted on the photodiode array chip 4 with the glass substrate 6 either held in tight contact with respective light receiving surfaces of the silicon photodiodes 2a and 3a of all arrays 2 and 3, or spaced a slight distance therefrom. In either case, the arrays 2 and 3 of the silicon photodiode 2a and 3a are aligned with the first and second halves 5A$_2$ and 5A$_3$ while the silicon photodiodes of each array 2 or 3 are respectively aligned with the filter elements in the respective half 5A$_2$ or 5A$_3$. It is to be noted that, in FIG. 1, the thickness of the interference filter 5 is exaggerated as compared with that of the photodiode array chip 4.

One of the silicon photodiode arrays, identified by 2, is used to detect a wavelength range of 400 to 550 nm, whereas the other of the silicon photodiode arrays identified by 3 is used to detect a wavelength range of 550 to 700 nm. The first half 5A$_2$ of the interference filter 5 corresponding to the wavelength range of 400 to 550 nm has the dielectric layer 5a greater in thickness than that on the second half 5A$_3$ of the same interference filter 5. In other words, at the first half 5A$_2$ of the interference filter 5, the center wavelength of each of the silicon photodiodes 2a is a secondary interference light, whereas at the second half 5A$_3$ of the interference filter 5 the center wavelength of each of the silicon photodiodes 3a is a primary interference light. In other words, the order of interference of the center wavelength of a region A which receives the light having wavelength within the range of 400 to 550 nm is m=2, and the order of interference of the center wavelength of a range B which receives the light having wavelength within the range of 550 to 700 nm is m=1, the order of interference in the range A being higher than that in the range B.

Reference numeral 40A represents a long-wavelength light cut-off filter, for example, an infrared light cut-off filter, arranged so as to confront a metal layer 3b at the region A, which filter 40A is operable at the first half 5A$_2$ of the filter 5 whose primary interference light is within the wavelength range of 770 to 980 nm to cut off the light having a wavelength within the range of 770 to 980 nm forming the primary interference light and also to permit the transmission therethrough of light having the wavelength within the range of 400 to 500 nm forming the secondary interference thereof.

Reference numeral 40B represents a short-wavelength light cut-off filter, for example, an ultraviolet light cut-off filter, arranged so as to confront a metal layer 3b at the region B, which filter 40B is operable at the second half 5A$_3$ of the filter 5 whose primary interference light is within the wavelength range of 500 to 700 nm to cut off light having the wavelength of 500 nm or shorter forming the secondary interference light thereof and also to permit the transmission therethrough of the light having wavelength within the range of 500 to 700 nm forming the primary interference light.

Hereinafter, the half width of the secondary interference light will be explained with the aid of examples of calculations.

Let it be assumed that in the film construction of SiO$_2$-Ag-SiO$_2$-Ag-SiO$_2$ both of the Ag layers are 650Å in thickness and $n \times d/\lambda_O$ of SiO$_2$ of the outermost layers is 0.25 wherein n represents the index of refraction, d represents the thickness, and $\lambda_o$ is 400 nm.

Figure 7:
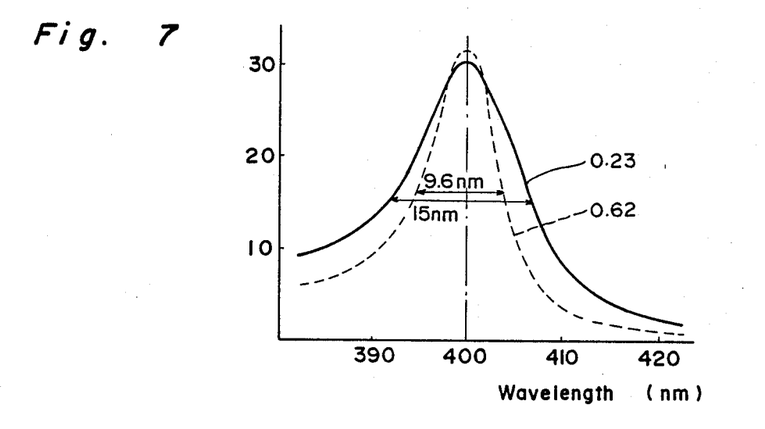
FIG. 7 is a graph showing the relationship between the wavelength and the transmission.

In this condition, when $n \times d/\lambda_o$ of the intermediate layer is rendered to be 0.23 and 0.62 by varying the film thickness d, such a wavelength-transmission characteristic as shown in FIG. 7 is obtained. $n \times d/\lambda_o = 0.23$ is related with the primary interference light and is shown by the solid line, whereas $n \times d/\lambda_o = 0.62$ is related with the secondary interference light and is shown by the broken line. The half width of the primary interference light is 15 nm, whereas that of the secondary interference light is 9.6 nm. That is, in the case where the center wavelength is 400 nm, it will be understood that the half width of the secondary interference light is narrower than that of the primary interference light.

The function of this construction is as follows.

Namely, assuming that k and yo represent respective proportionality constants, the half width W$_m$ of the m-order interference light is:

$$W_m = k/(m\pi - yo)$$

Hence, the half width W$_{m+1}$ of the (m+1)-order interference light is:

$$W_{m+1} = k/\{(m+1) \times \pi - yo\}$$

Therefore, the ratio between $W_{m+1}$ and $W_m$ is:

$$W_{m+1}/W_m = (m \times \pi - yo)/[(m+1) \times \pi - yo] < 1$$

and $W_m$ will become greater than $W_{m+1}$. The greater the order m, the narrower the half width $W_m$. Thus, $$W_m > W_{m+1} > W_{m+2} > W_{m+3} \ldots$$

According to the prior art, only the primary interference light is used and the half width is wide at the short wavelength region. However, in the present invention, since the order of interference of the center wavelength of the short wavelength region is rendered to be high at the short wavelength region in which the half width is wide, the half width can be narrowed even at the short wavelength region. Accordingly, the characteristic curve of the spectral sensitivity can be sharp and the S/N ratio can be improved.

Figure 2:
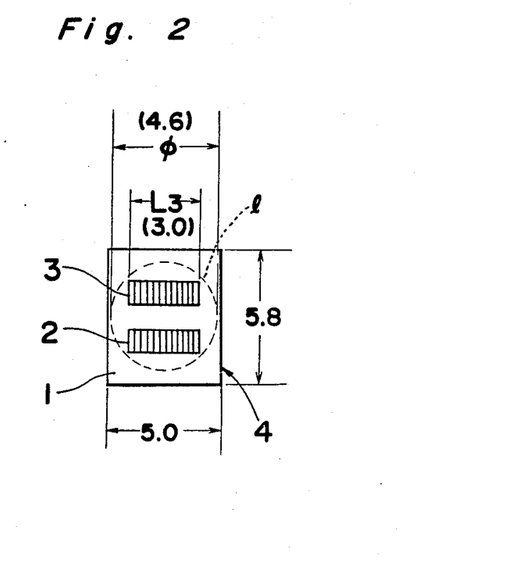
FIG. 2 is a plan view showing the relationship between silicon photodiode arrays and the spot of the incident light falling thereon in the spectral sensor of FIG. 1.

As shown in FIG. 2, a light spot 1 formed on the photodiode array chip 4 by a bundle of rays of light incident upon the spectral sensor and having passed through the filters 5 is selected to have a diameter $\phi$ which is slightly greater than the length $L_2$ or $L_3$ of each silicon photodiode array 2 or 3 so that all of the silicon photodiodes 2a and 3a of the respective arrays 2 and 3 can be covered within the circle represented by the shape of the light spot 1. The diameter $\phi$ of the light spot 1 is sufficiently reduced as compared with the diameter $\phi_1$ in the prior art spectral sensor shown in FIG. 14.

More specifically, the lengths $L_2$ and $L_3$ of the photodiode arrays 2 and 3 formed on the silicon substrate 1 of 5.0 mm in length and 5.8 mm in width are each 3.0 mm which is one half of the length $L_1$ (6.0 mm) of the photodiode array used in the prior art spectral sensor. The diameter $\phi$ of the spot of the radiating light beam 1, which is given a surplus, is 4.6 mm, this value being two thirds of the diameter $\phi_1$ (6.8 mm) according to the prior art.

While the surface area of the photodiode array chip 4 used in the embodiment remains generally equal to that of the photodiode array chip used in the prior art spectral sensor shown in and described with reference to FIGS. 13 to 15, the ratio of the width relative to the length of the photodiode array chip used in the prior art is 3.8:8.0 which is about 1:2 while that of the photodiode array chip used in the embodiment is 5.0:5.8 which is about 1.2:1.0. This means that the photodiode array chip used in the spectral sensor in the illustrated embodiment is generally square in shape and, therefore, where it is desired to be packaged, the package may have a simplified shape.

Figure 3:
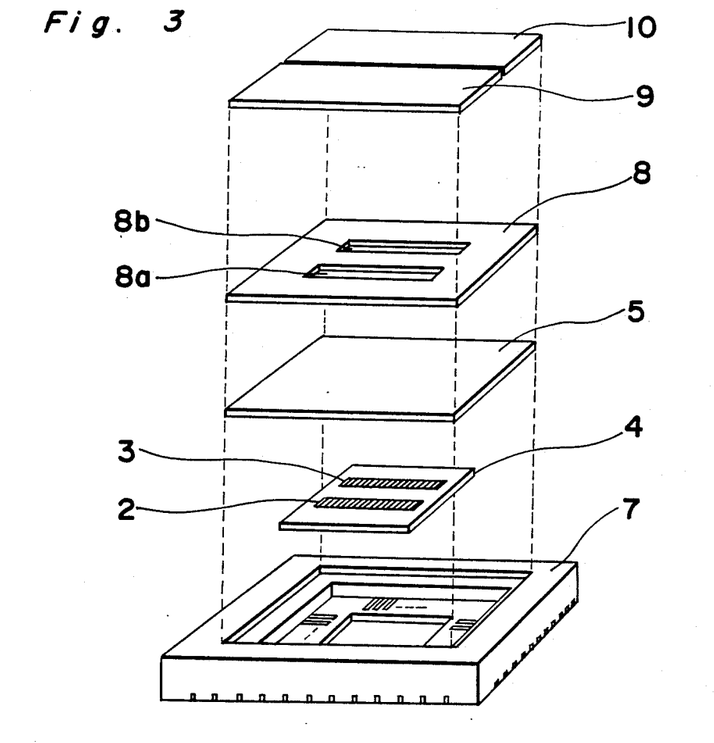
FIG. 3 is an exploded view of the spectral sensor illustrating the use of ultraviolet light and infrared light cut-off filters.

FIG. 3 illustrates, in exploded view, the spectral sensor wherein the assembly of the photodiode array chip 4 and the interference filter 5 is covered with an ultraviolet light cut-off filter 9 and an infrared light cut-off filter 10. More specifically, the spectral sensor shown is completed by accommodating the photodiode array chip 4, the interference filter 5, a slit member 8, and both of the ultraviolet light cut-off filter 9 and the infrared light cut-off filter 10 one above the other within a package 7 in the order specified above. The slit member 8 used in the spectral sensor according to the embodiment has generally rectangular slits 8a and 8b defined therein. The number of the slits 8a and 8b is equal to the silicon photodiode arrays 2 and 3 on the photodiode array chip 4, each of said rectangular slits 8a and 8b being of a size equal to that of the respective photodiode array 2 or 3.

The ultraviolet light cut-off filter 9 and the infrared light cut-off filter 10 are positioned in side-by-side fashion in alignment with the slits 8a and 8b in the slit member 8 and, hence, with the photodiode arrays 2 and 3. Since any one of the filters 9 and 10 is so sized as to cover only that part of the filter 5 which is to be covered thereby, i.e., the filter 9 covering the filter elements $F_1$ to $F_n$ and the filter 10 covering the filter elements $F_{n+1}$ to $F_{2n}$, the overlapping of these filters such as existing in the prior art spectral sensor is eliminated and, also, any possible reduction of an output from some of the photodiodes, which would occur if the filter elements $F_1$ to $F_n$ were covered by the ultraviolet light cut-off filter can be advantageously eliminated.

Figure 4:
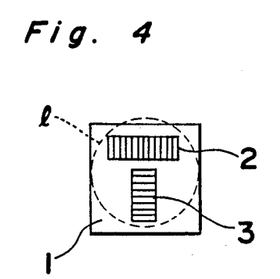
FIGS. 4 to 6 are views similar to FIG. 2, showing alternative arrangements of the photodiode arrays.
Figure 5:
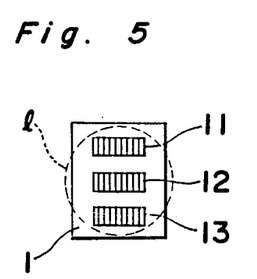
Figure 6:
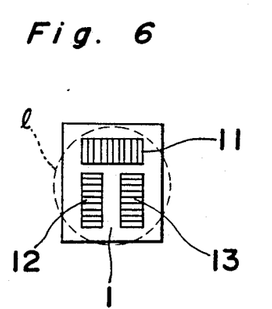

Although in the foregoing illustrated embodiment the photodiode arrays 2 and 3 has been shown and described as arranged in parallel relationship with each other, they may be arranged in a pattern similar to the shape of a figure "T" without allowing the arrays to touch the other of the arrays, such as shown in FIG. 4. Also, although reference has been made to the use of the two photodiode arrays in the illustrated embodiment, three photodiode arrays may be employed as identified respectively by 11, 12 and 13 in FIGS. 5 and 6. In particular, the photodiode arrays 11 to 13 are arranged, in the modification of FIG. 5, parallel to each other and, in the modification of FIG. 6, in a pattern generally similar to the shape of a figure "$\pi$".

In any event, the plural photodiode arrays are preferably arranged so as to occupy a circular surface area which occupies 60 to 90% of the sum of the respective lengths of the plural photodiode arrays.

With respect to the filter 5, it has been shown and described that for each photodiode one filter element has been employed. However, where the photodiodes in each array are recurred at interval of a finer pitch than that shown, two or more filtering elements may be assigned to each photodiode. Also, instead of the stepped lands used to define the filtering elements for each photodiode array, each of the halves $5A_2$ and $5A_3$ may have a continuously varying thickness so that the transmission wavelength can vary correspondingly continuously.

From the foregoing full description of the preferred embodiment of the present invention, it has now become clear that, since the required or desired number of the light receiving elements are divided into a plurality of groups each including an array of the light receiving elements, the length of each array of the light receiving elements can be reduced as compared with the prior art wherein the required or desired number of the light receiving elements are arranged in a single linear array. Moreover, since all of the arrays of the light receiving elements are arranged within a circular area of a diameter smaller than the sum of the respective lengths of the arrays without allowing one of the arrays to touch another or other arrays, the cross-sectional shape of a bundle of rays of light incident upon all of the arrays of the light receiving elements can be reduced as compared with that in the case where the light receiving elements are all arranged in a straight area. This in turn brings about reduction in size of the resultant array chip.

The cross-sectional shape of the bundle of rays of light incident upon all of the arrays of the light receiving elements and the size of the array chip can, according to the present invention, attain respective minimum values if the number of the arrays of the light receiving elements is two, these two arrays are arranged parallel to each other with their opposite ends aligned with each other, and the maximum or outer distance between these arrays is selected to be substantially equal to the length of any one of these arrays, such as shown in and described with reference to FIGS. 1 to 3.

Where the infrared light cut-off filter is arranged so as to confront one of the arrays which is adapted to detect the relatively short wavelengths and the ultraviolet light cut-off filter is arranged so as to confront the other of the arrays which is adapted to detect the relatively long wavelengths, not only can a wavelength component unnecessary to either of these arrays be cut off, but also any possible reduction in output resulting from both of the infrared light and ultraviolet light cut-off filters confronting the array such as in the prior art spectral sensor can be eliminated.

Hereinafter, modified forms of the embodiment of the present invention will be described.

Figure 9:
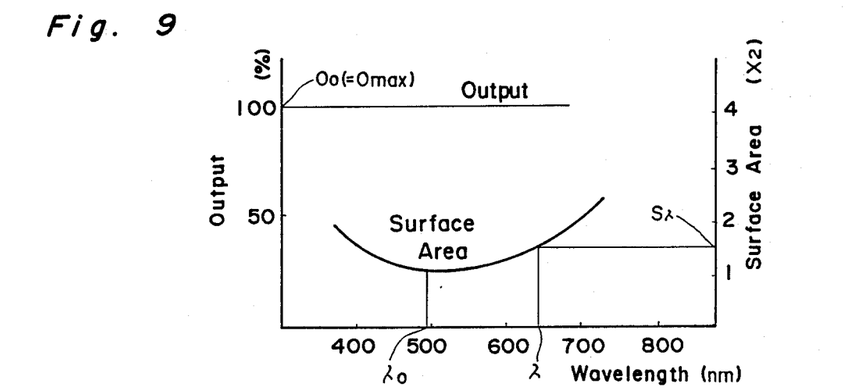
FIG. 9 is a graph showing the relationship among the output, the light receiving surface area and the wavelength employed in the present invention.

FIG. 9 illustrates the relationship among the wavelength, each of the silicon photodiodes, the light receiving surface area of the respective filter and the output of the silicon photodiode, according to the principle of the present invention.

The relationship between the characteristic of FIG. 9 and that of FIG. 8 is as follows.

In FIG. 8, the wavelength corresponding to the maximum output Omax and the output corresponding to an arbitrary wavelength $\lambda$ are expressed by $\lambda o$ and $O\lambda$. The light receiving surface area So of the silicon photodiodes and the filter remain the same irrespective of the wavelength. In FIG. 9, the light receiving surface areas of the silicon photodiodes and the filters corresponding to the wavelength $\lambda$ are expressed by $S_\lambda$. In order for the maximum output Omax shown in FIG. 9 to be equal to the maximum output Omax shown in FIG. 8 while the output Oo with respect to an arbitrary wavelength $\lambda$ remains constant, it may be made equal to any output. In such case, a different conversion equation may be used in place of the equation used in the above embodiment, and although the characteristic curve may be different from that shown in FIG. 9, the outputs from the silicon photodiodes can be rendered uniform relative to all of the wavelengths.

Figure 10:
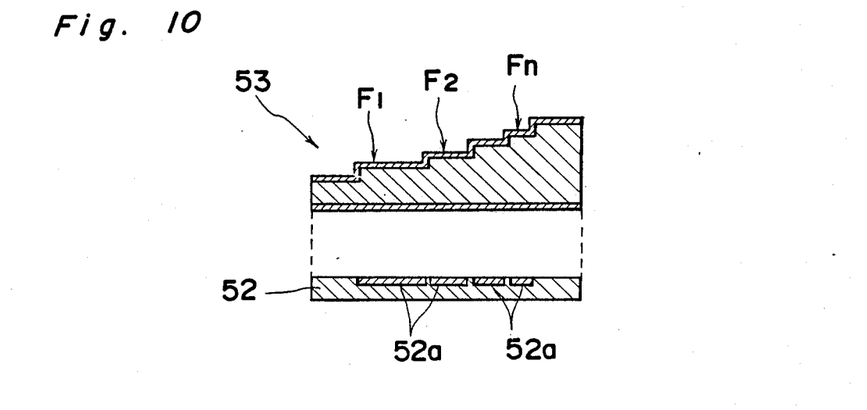
FIGS. 10 to 12 are schematic side sectional views showing different modifications of the present invention.

FIG. 10 illustrates a schematic sectional view of the spectral sensor according to the modified embodiment of the present invention. Only the difference it has relative to the embodiment structure will now be described.

Silicon photodiodes 52a forming a silicon photodiode array 52 which forms an array of light receiving elements having their light receiving surface areas defined in size relative to the measurement wavelength according to the characteristic diagram of FIG. 9. In other words, the light receiving surface areas of some of the photodiodes 52a sensitive to a short wavelength region shorter than 500 nm are rendered to be progressively increased while the light receiving surface areas of the remaining photodiodes 52a sensitive to a longer wavelength region are rendered to be progressively decreased. In addition, the surface areas of the filtering elements F1 to Fn of the interference filter that are associated with the respective wavelengths are selected to be equal to the light receiving surface areas of the silicon photodiodes 52a which are respectively aligned therewith.

In this construction, the outputs from the silicon photodiodes 52a corresponding respectively to the filtering elements F1 to Fn of the interference filter 53 which have permitted the transmission of the associated wavelengths contained in the radiated light can exhibit an equal value.

Where the measurement wavelength extends on respective regions of 500 nm, it is preferred that the light receiving surface areas of both of the silicon photodiodes 52a and the filtering elements F1 to Fn of the interference filter 53 progressively decrease from the shortest wavelength towards 500 nm and progressively increase from 500 nm towards the longest wavelength.

The spectral sensor of the construction shown in FIG. 10 and so designed as to exhibit such a characteristic as shown in FIG. 9 operates in the following manner.

When the design is made to progressively increase the light receiving surface areas of both of the light receiving element and the filtering elements of the interference filter with the decrease of the overall spectral sensitivity of the light receiving element and the filtering elements, the light receiving surface areas of both of the light receiving elements and the filtering elements are so selected that the outputs from the light receiving elements can produce substantially identical outputs with respect to the respective wavelengths they receive. Therefore, the respective outputs from the light receiving elements can be made substantially constant without being adversely affected by the wavelength-output characteristic of the light receiving elements and the wavelength-transmission characteristic of the interference filter.

Figure 11:
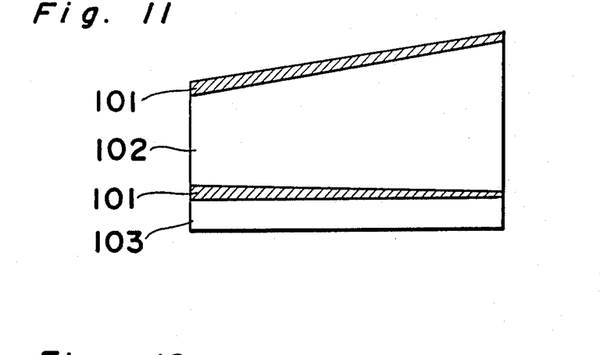

Referring to FIG. 11 illustrating the other modified embodiment of the present invention, a dielectric layer 102 having a continuously varying thickness with a right-hand portion thereof and the opposite, left-hand portion thereof exhibiting the maximum and minimum thicknesses, respectively, has its opposite surfaces deposited with first and second metal layers 101 each having a continuously varying film thickness in a sense opposite to the direction in which the thickness of the dielectric layer 102 varies continuously. Except for this feature, the structure shown according to this modified embodiment of the present invention is substantially identical with that according to the first mentioned embodiment thereof.

Figure 12:
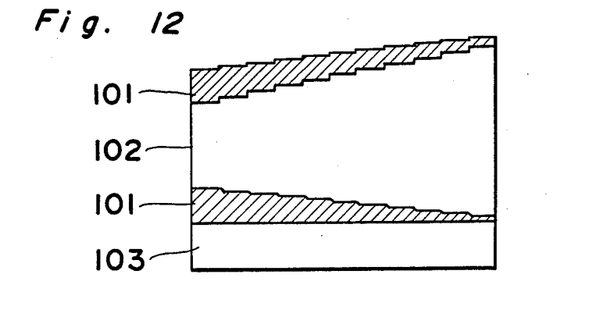

FIG. 12 illustrates further another modified embodiment of the present invention. This modified embodiment of FIG. 12 differs from the modified embodiment of FIG. 11 in that, in the structure of FIG. 12, the thickness of the dielectric layer 102 is stepwisely varying and, correspondingly, the thickness of each of the metal layers 101 is stepwisely varying in a sense opposite to the direction in which the thickness of the dielectric layer 102 varies stepwisely. Nevertheless, the thickness of each of portions of any one of the metal layers 101 which align with respective lands delimited by the stepwise variation of the thickness of the dielectric layer 102 is uniform all over the entire surface area of such portion of any one of the metal layers 101.

It is, however, to be noted that, even in the case of the structure shown in FIG. 11, that is, even in the case where the thickness of the dielectric layer stepwisely varies, only a portion of each of the metal layers corresponding to the short wavelength region (a region whose center wavelength is not longer than 500 nm) may have a uniform thickness.

It is eventually indicated that, as has been discussed in connection with the first-mentioned embodiment, the transmittance decreases with increase in thickness of the metal layer and, therefore, the output from the spectral sensor utilizing this metal interference filter decreases. This problem can be substantially avoided by increasing the light receiving surface areas of the light receiving elememts of the spectral sensor.

By so doing, the half width of that portion of the metal layer which has the increased thickness can be narrowed with the characteristic thereof getting sharp. Therefore, the spectral sensor utilizing the metal interference filter according to the modified embodiment can exhibit an improved S/N ratio with high precision.

Although the present invention has fully been described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

We claim:

1. A spectral sensor comprising:
   an interference filter which transmits light incident thereon while dividing the incident light into a plurality of light components having different wavelengths, the respective wavelengths being continuously or stepwisely varied in accordance with the position of the incident light, and
   at least one light receiving array for receiving light transmitted through the interference filter to convert respective intensities of the plurality of light components into corresponding electrical signals, said light receiving array including a plurality of light receiving elements arranged for receiving the plurality of light components divided by the interference filter, a light receiving element determined corresponding to the shorter wavelength being positioned to receive the higher order of a center wavelength of interference by the interference filter than that corresponding to the longer wavelength.

2. The spectral sensor as claimed in claim 1, wherein the interference filter includes an interference layer whose thickness increases in accordance with increasing the order of a center wavelength of interference by the interference filter.

3. The spectral sensor as claimed in claim 1, further comprising cutoff means for cutting off any interference light having a lower or higher order of a center wavelength of interference than a required order of a center wavelength of interference.

4. The spectral sensor as claimed in claim 1, wherein the interference filter is constructed so that the primary and secondary interference light of the interference filter is received by the light receiving array.

5. The spectral sensor as claimed in claim 4, wherein the interference filter includes an interference layer in which the thickness of the interference layer corresponding to the secondary interference light is greater than that corresponding to the primary interference light.

6. The spectral sensor as claimed in claim 5, further comprising interrupting means for interrupting the primary interference light and third and higher interference light from incidence on the light receiving array.

7. A spectral sensor comprising:
   filtering means for transmitting and dividing incident light into a plurality of light components having different wavelengths, the respective wavelengths being continuously or stepwisely varied in accordance with the position of the incident light, and
   light receiving means for receiving the light transmitted through the filtering means to convert the respective intensities of the plurality of light components into corresponding electrical signals, said light receiving means including a plurality of light receiving arrays, each of said light receiving arrays including a plurality of light receiving elements arranged within an imaginary circle having a diameter smaller than the sum of lengths of all of the light receiving arrays.

8. The spectral sensor as claimed in claim 7, wherein the number of the light receiving arrays of the light receiving means is two, said two arrays having an equal length and being arranged parallel to each other.

9. The spectral sensor as claimed in claim 8, wherein said two arrays have their respective opposite ends aligned with each other and spaced a distance from each other, said distance being measured from one of the opposite side edges of one of the arrays remote from the other of the arrays and one of the opposite side edges of the other of the arrays remote from said one of the arrays, said distance being substantially equal to the length of any one of the arrays.

10. The spectral sensor as claimed in claim 8, further comprising an infrared light cut-off filter disposed so as to cover one of the arrays which has a transmission range of relatively short wavelength, and an ultraviolet light cut-off filter disposed so as to cover the other of the arrays which has a transmission range of relatively long wavelength.

11. A spectral sensor which comprises at least one array of light receiving elements having different photoelectric conversion efficiencies according to a wavelength, and a plurality of filtering members having different transmissions according to a wavelength and disposed in face-to-face relationship with or in contact with the respective light receiving elements, both of said light receiving elements and said filtering elements having respective light receiving surface areas increasing with decrease in wavelength region of the overall spectral sensitivity of the light receiving element array and the filtering members.

12. The spectral sensor as claimed in claim 11, wherein each of the light receiving elements is a silicon photodiode.

* * * * *